2,873,391

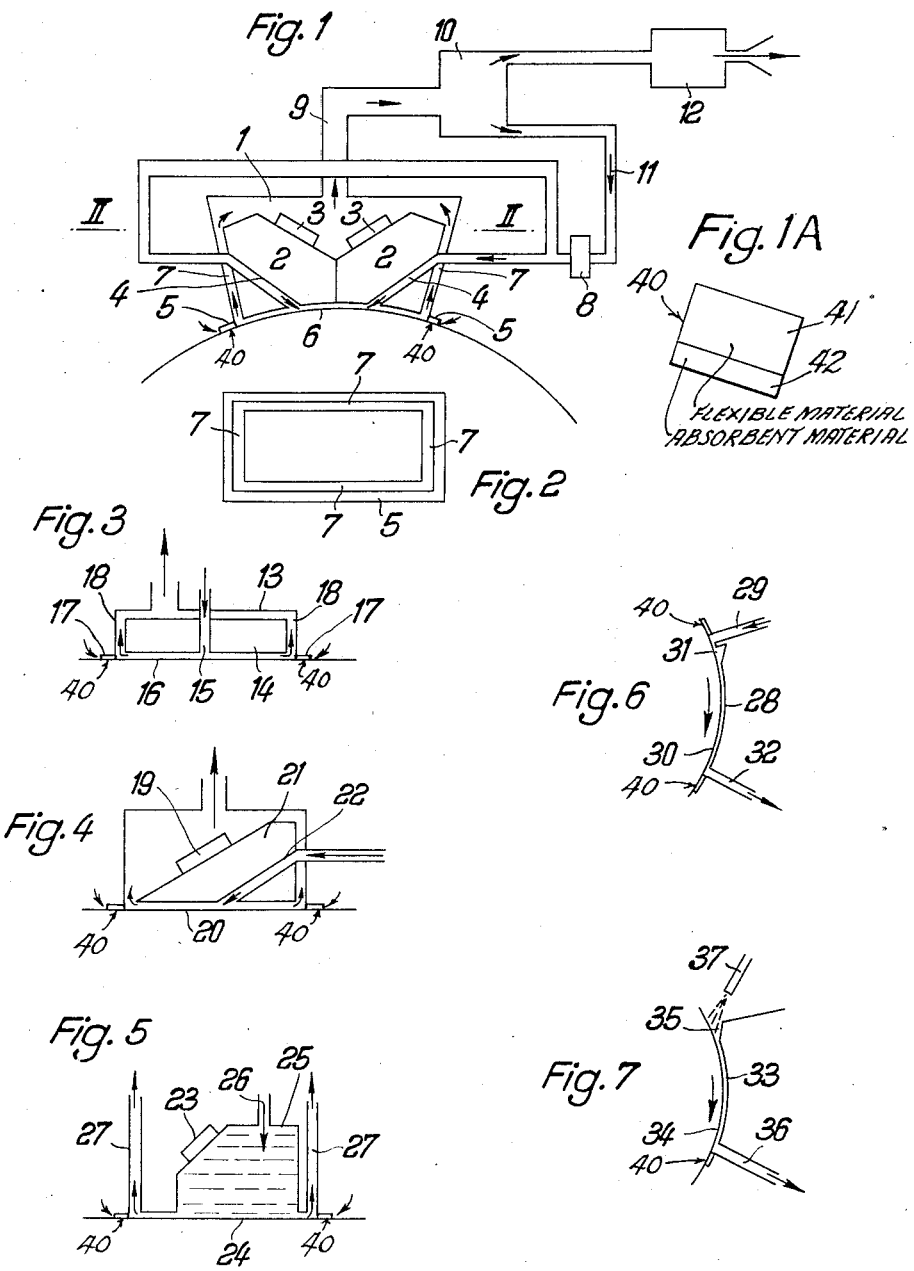

METHODS AND MEANS FOR COUPLING AN ULTRASONIC TRANSDUCER TO A TEST SPECIMEN

Harald Schulze, Bochum, Germany, assignor to Sperry Products Inc., Danbury, Conn.

Application November 4, 1955, Serial No. 545,071

1 Claim. (Cl. 310—8.3)

This invention relates to a method of and apparatus for coupling a sound transmitter or receiver to a test specimen.

It is known to improve the coupling of a sound transmitter or receiver to a test specimen by interposing a liquid layer between them. To this end the test specimen may be directly immersed in the liquid or is entirely or partly wetted by the coupling medium. Particularly in the case of very rough and irregular surfaces it is very difficult to maintain the space between the sound transmitter and specimen surface uniformly filled with the coupling medium, particularly if the sound transmitter is moved relative to the test specimen. To avoid this difficulty, viscous coupling liquids or pastes, e. g., have been used and have been provided with additional wetting agents. It has also been suggested to provide the sound transmitter with a liquid supply.

The previous methods have considerable disadvantages. The dipping of the test specimen in liquid is possible without substantial expenditure only in the case of small specimens. The local application of coupling medium causes in most cases inconvenience due to contamination. This is particularly undesirable where viscous coupling liquids are used, such as oil or paste.

Particularly in the automatic testing of workpieces with supersonics, e. g., according to the impulse reflection method, a reliable coupling involves great difficulties.

In an important method employed for testing sheet and tubing, supersonic waves which fall in at an oblique angle and move along a zig-zag course between the tube walls are used for the detection of cracks, doubling, and the like faults. The normal reflection of the sound wave on the surface will be disturbed by residual coupling medium, particularly if the same is in the form of drops or lumps, as will be the case with a viscous or pasty liquid. With that method the specimen cannot be tested in an entirely immersed condition because the sound wave is not transmitted in the specimen but enters the surrounding liquid.

This invention relates to a method of coupling a sound transducer (transmitter or receiver) to a test specimen by means of a coupling medium, particularly for materials tests with supersonics, e. g., according to the impulse reflection method. The essential feature of that method resides in that the coupling medium is supplied to the space between the sound transducer and the specimen surface and is prevented from escaping into the open at the edges of the sound transducer by sealing means provided there. Other features of the invention reside in that the coupling medium is kept continually in a flowing condition in the space between the sound transducer and the specimen surface and that the coupling medium is continuously supplied and is continuously discharged, e. g., by suction, at the edge of the sound transducer surface.

With that method it is possible to use a highly fluid coupling medium, e. g. water, without running a risk that the coupling could become imperfect, because ample liquid can be supplied without causing a disturbance by escaping liquid. Besides, during the movement of the sound transmitter no liquid will remain back on the surface which might disturb the zig-zag and straight-line courses to be followed by the waves in the above-mentioned method of testing.

According to the invention the coupling medium is supplied under superatmospheric pressure and is sucked by negative pressure from the edge of the sound transmitting surface. The negative pressure at the edge of the sound transducer is kept sufficiently high to maintain a sub-atmospheric pressure on the inside of the sealing edge.

According to a special embodiment of the method the coupling medium may be sprayed onto the surface of the moving test specimen just in front of the edge of the sound transducer which is in front with respect to the relative movement of the test specimen. This mode of applying the coupling medium appears particularly desirable if the sound transducer is moved along a spiral course about the rotating test specimen, e. g. a steel cylinder, and tests are carried out in quick succession on the entire surface of the test specimen.

The gap which surrounds the sound transducer and serves for sucking off the coupling medium causes the sound transducer to be forced against the test specimen with the pressure which corresponds to the prevailing negative pressure and the effective area. This additional pressure of application, which may be varied by the area and by the negative pressure, is of great advantage, particularly in automatic testing operations, where the sound transducer may tend to dance at higher speeds owing to irregularities on the surface of the test specimen.

In many cases it is suitable to keep the sound transducer with magnetic forces on the test specimen. For this purpose permanent magnets or electromagnets may be used. The latter afford the advantage that they consist of very hard materials capable of taking up the friction between sound transducer and test specimen without appreciable wear.

The essential feature of the apparatus for carrying out the method of the invention resides in that the rim of the sound transducer is surrounded by a sealing strip, which blocks the passage of liquid toward the outside and permits of the entrance of air from the outside below the strip. The discharge or suction duct for the coupling medium is provided on the inside of the sealing strip and surrounds the sound transducer. This does not only prevent an escape of liquid toward the outside but also ensures, by the suction of outside air, a quick drying particularly of the marginal zones. The atmospheric pressure acting from the outside causes a reliable pressing of the sound transmitter onto the specimen surface. With this arrangement it is easy to dispose the suction duct surrounding the sound transmitter so closely at the entrance point of the sound ray that the first point of reflection on the specimen surface is free of liquid already.

To maintain the seals effective when the sound transducer is moved on irregularly shaped test specimens, the seals are formed according to the invention from resilient and yielding material, such as rubber, foamed plastics or a dense row of bristles, laminations or slides.

In order to free the specimen surface from liquid when the sound transducer is moved relative to the test specimen, a strong air stream enters from the outside into the suction gap which surrounds the sound transducer, in order to blow off the residual liquid. The drying action may be increased by forming the outer rim of that suction gap of absorbent material so that the capillary action will cause an additional drying of the surface when the sound transducer is moved relative to the test specimen.

In a preferred embodiment of the invention the coupling liquid is supplied directly through a bore of the sound transducer, consisting, e. g., of a piezo-electric quartz plate. This enables a particularly simple and favorable distribution of the liquid between the sound transducer and test specimen.

It is known to interpose a sound refracting body between an electro-mechanical oscillator and the surface of the test specimen in the testing of materials with supersonic waves incident at an oblique angle. The sound wave is refracted and/or focused as desired in that sound refracting body. In this case the invention provides for conducting the coupling medium through bores in said body.

Since a negative pressure prevails in the gap surrounding the sound transducer and this pressure is effective at the surface between the sound transducer and test specimen, the liquid is sucked from the bores into the space between the sound transducer and test specimen. It is a special advantage of this method that it is now possible to replace the wedge-shaped intermediate body otherwise required in the test specimen to enable the inclined incidence of the sound rays by providing for a correspondingly shaped space filled by the coupling medium. Thus the number of disturbing boundary faces is reduced and the sound ray is refracted and/or focused as it passes through the coupling medium. It is a special advantage of the method of the invention that the coupling medium does not appear on the outside. This is particularly apparent when the sound transducer is lifted from the test specimen. In this case the supply of coupling medium will cease automatically. Since the coupling medium is sucked off, there is no negative pressure at the liquid outlet points when the sound transducer is lifted. For this reason no liquid can escape.

If the liquid enters under superatmospheric pressure a shut-off member is required for stopping the pump. This can be achieved mechanically upon lifting the sound transducer if the stopping of the pump is coupled with the lifting of the sound transducer. Alternatively, according to a preferred embodiment of the invention, the same purpose can be achieved by a negative-pressure controlled valve by utilizing the negative pressure generated or increased as the sound transducer is applied for opening the normally blocked supply of the coupling medium.

According to the invention the coupling medium employed is conducted in a cycle, whereby losses are avoided and a larger supply becomes superfluous. In this connection the sucked-off coupling medium must be sufficiently separated from the entrained air. According to the invention this is performed in a so-called cyclone.

To achieve a quick evaporation of the coupling medium applied to the surface of the test specimen a highly volatile liquid may be used according to the invention as a coupling medium.

The drawing shows several illustrative embodiments of apparatus for carrying out the process according to the invention.

Fig. 1 shows a preferred embodiment of the invention, which is particularly useful for testing round articles, such as steel cylinders.

Fig. 1A is an enlargement of a detail of Fig. 1.

Fig. 2 is a plan view of the apparatus in a section taken on line II—II of Fig. 1.

Figs. 3–5 show additional embodiments of the apparatus, for testing flat articles such as sheet metal.

Figs. 6 and 7 are diagrammatic views showing a modified embodiment of apparatus preferred for round specimens in a state of motion.

A pair of sound refracting bodies 2, e. g., of Plexiglas, are arranged in a casing 1 and each carry a sound transmitter 3, e. g. a piezoelectric quartz plate. The bodies 2 are provided with bores 4 for the supply of coupling medium. The casing 1 rests with the flange 5 on the surface of the test specimen 6. A pump 8 forces the coupling medium under pressure through the bores 4 into the narrow gap left between the underside of the body 2 and the surface of the test specimen 6. The coupling medium is sucked off by negative pressure through a suction gap 7, which extends all around the entire apparatus between the bodies 2 and the inside wall of the casing 1. Owing to the negative pressure in gap 7, outside air is induced on the underside of the flange 5 of the casing 1 and contributes to the drying of the tested surface. The liquid-and-air mixture sucked off flows through the conduit 9 into a cyclone 10, where the liquid is separated from the air and the foreign matter entrained. The liquid is return to the pump 8 through the conduit 11, whereby the cycle is closed. The air and foreign matter are sucked off by a device 12, e. g. a vacuum cleaner.

The sealing strip 40 formed by the underside of the flange 5 of the casing 1 may be formed of resiliently yielding material 41 (see Fig. 1A), such as rubber, foamed plastics or a dense row of bristles, laminations or slides. The lower edge of the sealing strip may consist of absorbent material 42, if required.

The apparatus shown in Fig. 3 serves mainly for the testing of flat articles, such as sheet metal. It consists of a casing 13, in which the electro-mechanical oscillator 14 is arranged. This is formed with a bore 15, through which the coupling medium is supplied under pressure, which is distributed in the gap between the sound transmitter 14 and the test specimen 16. Outside air can be induced at the underside of the flange 17 of the casing 13 and the liquid-and-air mixture is sucked off through the conduits 18 by negative pressure.

The embodiment shown in Fig. 4 is substantially equal to that of Fig. 1, a sound transmitting body 21, e. g., of Plexiglas, provided with a bore 22 for the supply of the coupling medium, being arranged between the sound transmitter 19 and the surface of the test specimen 20.

In the embodiment shown in Fig. 5 a casing 25 is arranged between the sound transmitter 23 and the test specimen 24. That casing is supplied at 26 with the coupling medium under the pressure and is completely filled by said medium. The dimensions of said casing are determined so that the sound ray is refracted and/or focused as it passes through the coupling medium. By that arrangement the number of disturbing boundary faces is minimized. According to Fig. 6 the coupling medium is supplied to the sound transmitter 28 at 29 and flows through the test specimen 30, rotating in the sense of the arrow, into the groove 31 terminated by a lubricating wedge portion, and farther into the space between the sound transmitter and test specimen; it is sucked from that space at 32.

In the modification shown in Fig. 7 the groove 35 terminating in a lubricating wedge portion is disposed at that edge of the sound transmitter which is in front with respect to the sense of rotation of the test specimen 34. The coupling medium is thus sprayed onto the surface of the test specimen at 37 just in front of the front edge of the sound transmitter and enters the space between the sound transmitter and test specimen owing to the rotation of the test specimen. The coupling medium is sucked from that space at 36.

Thus the sound transmitter can be moved in a spiral course along the surface of the rotating test specimen and materials tests can be performed in a quick succession throughout the surface of the test specimen.

What is claimed is:

Apparatus for transmitting sound, comprising, a sound transducer adapted to be held spaced from an adjacent surface of a test specimen, liquid inlet means opening into the space between said sound transducer and said adjacent surface, a sealing strip of resiliently yielding material formed at the rim of said sound transducer and constructed and arranged to inhibit an escape of liquid out of said space and permitting an ingress of air from the outside below said strip, and means for removing liquid from said space adjacent to said rim, said sealing strip having an absorbent lower rim to cause drying of said adjacent surface of the test specimen by capillary action upon relative movement between said sound transducer and said adjacent surface.

References Cited in the file of this patent

UNITED STATES PATENTS 2,592,134    Firestone _____ Apr. 8, 1952

FOREIGN PATENTS

| 893,459 | France | Jan. 31, 1944 |
| 894,737 | France | Mar. 20, 1944 |
| 654,673 | Germany | Dec. 24, 1937 |
| 887,278 | Germany | Aug. 20, 1953 |

OTHER REFERENCES

Sheet Fractures Detected With Supersonics, "The Iron Age," June 8, 1944, pages 60 and 61.